US009485282B2

(12) United States Patent
Jung

(10) Patent No.: US 9,485,282 B2
(45) Date of Patent: Nov. 1, 2016

(54) METHOD AND APPARATUS FOR NEGOTIATING COLOR INFORMATION IN IMAGE COMMUNICATION SYSTEM

(71) Applicant: Samsung Electronics Co., Ltd., Suwon-si, Gyeonggi-do (KR)

(72) Inventor: Kyung-Hun Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/414,300

(22) PCT Filed: Jul. 8, 2013

(86) PCT No.: PCT/KR2013/006042
§ 371 (c)(1),
(2) Date: Jan. 12, 2015

(87) PCT Pub. No.: WO2014/010895
PCT Pub. Date: Jan. 16, 2014

(65) Prior Publication Data
US 2015/0207825 A1 Jul. 23, 2015

(30) Foreign Application Priority Data

Jul. 10, 2012 (KR) .......................... 10-2012-0074932

(51) Int. Cl.
*H04N 7/14* (2006.01)
*H04L 29/06* (2006.01)

(52) U.S. Cl.
CPC ....... *H04L 65/1069* (2013.01); *H04L 65/1006* (2013.01); *H04L 65/1016* (2013.01); *H04L 65/602* (2013.01); *H04L 69/04* (2013.01); *H04L 69/24* (2013.01); *H04N 7/147* (2013.01)

(58) Field of Classification Search
CPC ........ H04N 7/14; H04N 7/141; H04N 7/142; H04N 7/147; H04L 69/04; H04L 69/24; H04L 65/602; H04L 65/1006; H04L 65/1069; H04L 65/1016
USPC ............ 348/14.01–14.16; 709/204, 224, 230
See application file for complete search history.

(56) References Cited

U.S. PATENT DOCUMENTS

| 2005/0071459 | A1* | 3/2005 | Costa-Requena et al. ... 709/224 |
| 2008/0055399 | A1* | 3/2008 | Woodworth et al. ...... 348/14.12 |
| 2009/0061927 | A1* | 3/2009 | Lam et al. ................. 455/556.1 |

(Continued)

FOREIGN PATENT DOCUMENTS

| KR | 10-2006-0058902 A | 6/2006 |
| KR | 10-2010-0084653 A | 7/2010 |

(Continued)

*Primary Examiner* — Melur Ramakrishnaiah
(74) *Attorney, Agent, or Firm* — Jefferson IP Law, LLP

(57) ABSTRACT

A method and apparatus for a video call service in a communication system is provided. The method includes transmitting, in a process of configuring a session together with a second terminal by a first terminal, resolution information and color information of an image, which are transmittable and receivable, to the second terminal by the first terminal, receiving the resolution information and the color information of the image, which are transmittable and receivable by the second terminal, from the second terminal by the first terminal, and compressing the image according to the received resolution information and the received color information, and transmitting the image to the second terminal, by the first terminal.

25 Claims, 6 Drawing Sheets

(56) References Cited

U.S. PATENT DOCUMENTS

| | | |
|---|---|---|
| 2009/0262048 A1 | 10/2009 | Park et al. |
| 2010/0309382 A1 | 12/2010 | Matsubayashi |
| 2011/0239264 A1 | 9/2011 | Goto et al. |
| 2012/0002718 A1 | 1/2012 | Jun et al. |
| 2012/0113150 A1 | 5/2012 | Kim et al. |
| 2013/0275615 A1* | 10/2013 | Oyman .................. 709/231 |

FOREIGN PATENT DOCUMENTS

| | | |
|---|---|---|
| KR | 10-2012-0002918 A | 1/2012 |
| KR | 10-2012-0047512 A | 5/2012 |
| WO | 2010/024102 A1 | 3/2010 |

\* cited by examiner

```
                    1st SDP offer
m=video 49154 RTP/AVP 99 100
a=tcap:1 RTP/AVPF
m=video 49154 RTP/AVP 99
a=pcfg:1 t=1
b=AS:384
b=RS:0
b=RR:2500
a=rtpmap:99 H264/90000
a=fmtp:99 packetization-mode=0; profile-level-id=42e00c
a=imageattr:99 send [x=176,y=144] [x=240,y=320] [x=320,y=480] [x=480,y=640]
recv [x=176,y=144] [x=240,y=320] [x=320,y=480] [x=480,y=640,q=0.6]
m=video 49158 RTP/AVP 100
a=pcfg:1 t=1
b=AS:57
b=RS:0
b=RR:2500
a=rtpmap:100 H263-2000/90000
a=fmtp:100 profile=0;level=10
a=sendrecv
```

FIG.2
(RELATED ART)

```
                    1st SDP offer
m=video 49154 RTP/AVP 99
a=acfg:1 t=1
b=AS:384
b=RS:0
b=RR:2500
a=rtpmap:99 H264/90000
a=fmtp:99 packetization-mode=0; profile-level-id=42e00c
a=imageattr:99 send [x=480,y=640] recv [x=320,y=480, q=0.7] [x=480,y=640]
a=sendrecv
```

FIG.3
(RELATED ART)

```
1st SDP offer
m=video 49154 RTP/AVP 99 100
a=tcap:1 RTP/AVPF
m=video 49154 RTP/AVP 99
a=pcfg:1 t=1
b=AS:384
b=RS:0
b=RR:2500
a=rtpmap:99 H264/90000
a=fmtp:99 packetization-mode=0; profile-level-id=42e00c
a=imageattr:99 send [x=176,y=144] [x=240,y=320] [x=320,y=480] [x=480,y=640]
recv [x=176,y=144] [x=240,y=320] [x=320,y=480] [x=480,y=640,q=0.6]
a=ColorFormat:99 send YCbCr444 YCbCr422 YCbCr420 YCbCr411 RGB recv
YCbCr444 YCbCr422 YCbCr420 YCbCr411[q=0.6] RGB
m=video 49158 RTP/AVP 100
a=pcfg:1 t=1
b=AS:57
b=RS:0
b=RR:2500
a=rtpmap:100 H263-2000/90000
a=fmtp:100 profile=0;level=10
a=ColorFormat:100 send YCbCr444 YCbCr422 YCbCr420 YCbCr411 RGB recv
YCbCr444 YCbCr422 YCbCr420 YCbCr411[q=0.6] RGB
a=sendrecv
```

FIG.5

```
1st SDP offer
m=video 49154 RTP/AVP 99
a=acfg:1 t=1
b=AS:384
b=RS:0
b=RR:2500
a=rtpmap:99 H264/90000
a=fmtp:99 packetization-mode=0; profile-level-id=42e00c
a=imageattr:99 send [x=480,y=640] recv [x=320,y=480, q=0.7] [x=480,y=640]
a=ColorFormat:99 send YCbCr411 recv YCbCr411
a=sendrecv
```

FIG.6

METHOD AND APPARATUS FOR NEGOTIATING COLOR INFORMATION IN IMAGE COMMUNICATION SYSTEM

CROSS-REFERENCE TO RELATED APPLICATION(S)

This application is a U.S. National Stage application under 35 U.S.C. §371 of an International application filed on Jul. 8, 2013 and assigned application number PCT/KR2013/006042, which claimed the benefit of a Korean patent application filed on Jul. 10, 2012 in the Korean Intellectual Property Office and assigned Serial number 10-2012-0074932, the entire disclosure of which is hereby incorporated by reference.

TECHNICAL FIELD

The present disclosure relates to an image communication system. More particularly, the present disclosure relates to a method and an apparatus for negotiating color information between image communication terminals.

BACKGROUND

A communication system providing a voice call service and a video call service based on an Internet Protocol (IP) starts the services by transmitting information on call conditions such as the type of image compression technology, a bit rate, the size of an image, and the like. The information on the call conditions is transmitted to a counterpart terminal by a terminal, which initiates a call by mutually negotiating the call conditions between the two terminals.

FIG. 1 is a signal flow diagram illustrating a general process of negotiating a session for a video call service based on an IP according to the related art.

Referring to FIG. 1, a transmission terminal 100 describes call conditions, which the transmission terminal 100, on a Session Description Protocol (SDP) offer in operation 101, takes the SDP in a Session Initiation Protocol (SIP) INVITE message, and transmits the SIP INVITE message to a reception terminal 140 in operation 102. The SIP message including the SDP offer is transferred to the reception terminal 140 via an IP Multimedia Subsystem (IMS) entity 120 and Policy and Charging Rules Function (PCRFs) 110 and 130 in a wired/wireless network. The SIP message guarantees call quality, such as a Voice over Long Term Evolution (VoLTE), and is transferred to the reception terminal via a management server in the Internet.

The reception terminal 140, which has received the SIP message including the SDP offer of the transmission terminal 100, reviews an image processing ability, a service policy, a bit rate, the size of an image, etc. of video COder/DECoders (CODECs) mounted therein. The reception terminal 140 writes an SDP answer including information on call conditions which the reception terminal 140, takes the SDP answer 103 in a SIP 183 session progress, and transmits the SIP 183 session progress to the transmission terminal 100 in operation 104.

When the transmission terminal 100 receives the SDP answer of the reception terminal 140 and accepts the SDP answer, a mutual confirmation process is performed therebetween, and then a call starts. When the transmission terminal 100 does not accept the SDP answer of the reception terminal 140, the transmission terminal 100 configures a new SDP offer. The transmission terminal 100 takes the new SDP offer in a SIP UPDATE message, and transmits the SIP UPDATE message to the transmission terminal in operation 105, and the reception terminal 140 rewrites an SDP answer, takes the rewritten SDP answer in a SIP 200 OK message, and transmits the SIP 200 OK message to the transmission terminal 100 in operation 106. When the transmission terminal 100 accepts the second SDP answer of the reception terminal 140, the transmission terminal 100 transmits a SIP Provisional Response ACKnowledgement (PRACK) to the reception terminal 140 as a response in operation 107, the reception terminal 140 transmits a SIP 200 OK message to the transmission terminal 100 as a response thereto, and thereby the negotiations are completed and calling starts in operations 108 and 109. When mutually-acceptable common call conditions have not been negotiated, the transmission terminal 100 or the reception terminal 140 gives up the video call and makes a proposal for a voice call.

FIG. 2 illustrates an example of a detailed configuration of an SDP offer illustrated in FIG. 1 according to the related art.

Referring to FIG. 2, the transmission terminal supports two types of video CODECs of H.264 and H.263. H.264 includes information indicating that an image may be encoded and decoded into four kinds of sizes of 176*144, 240*320, 320*480 and 480*640 at a bit rate of up to 384 kbps and especially an image having a size of 480*640 is desired to be received. Such an image processing ability should exist within a range designated by a value of profile-level-id in H.264. H.263 includes only a proposal to use a bit rate of 57 kbps, in which case, since a profile and a level value, which indicate an image processing ability of H.263, designate only one size of image of 176*144, the size of image need not be negotiated.

In the 4G network represented by the Long Term Evolution (LTE), a bit rate of an image service increases considering the transmission capability of the 4G network. Accordingly, an HD level of H.264 L3.1 is recommended. Further, in the Rich Communication Suite (RCS) adopted by the Global System for Mobile communication Association (GSMA), an image service such as video-sharing in addition to the video call has appeared, and a procedure of negotiating the size of video with respect to a pixel level is introduced, so that it is necessary to negotiate, with a counterpart terminal, a process of compressing an image with respect to a video CODEC, a bit rate, the size of a receivable and compressible image of a terminal, and the like.

FIG. 3 illustrates a detailed configuration of an SDP answer corresponding to FIG. 2 according to the related art.

Referring to FIG. 3, the SDP offer, which is received from the transmission terminal, represents that H.264 video CODEC is selected, a bit rate of 384 kbps is accepted, it is accepted that an image is compressed into the size of 480*640 and then transmitted, and the transmission terminal itself prefers to receive an image having the size of 320*480. This fact implies that the reception terminal can receive and restore an image of 320*480 simultaneously while compressing an image of 480*640 and transmitting the image of 480*640 to the transmission terminal.

In FIG. 3, "a=sendrecv" implies that such a compression condition is applied to both the transmission direction and the reception direction in a current session, and when different bit rates are used in the two directions, the reception terminal separately writes compression conditions to which "a=send" and "a=recv" are applied, and performs negotiations. In this way, as the SDP offer is complicated, a period of time consumed for session negotiations increases and it is difficult to predict a result of the negotiation.

There are various resolutions and various material properties of display panels, which are reasons that negotiations between the transmission terminal and the reception terminal make difficult. Display panels of mobile phones, which have mainly employed Liquid Crystal Displays (LCDs) using a Red/Green/Blue (RGB) scheme, are recently being changed to Organic Light Emitting Diode (OLED) displays or panels having various physical characteristics and various pixel structures. From among these, recently, there is trend of using panels having a PenTile™ structure in order to achieve high resolution in the OLED of which a manufacturing process is complex and a yield rate is low. Further, a technology of applying, to the OLED panel, White RGB (WRGB), which has been introduced to enhance white color processing in the LCD, as well as the RGB has been introduced to Television (TV) displays in addition to mobile phones.

An image compressed by a video encoder of a transmission device should be restored to an image suitable for a display of a reception device. When information on characteristics of the display panel of the reception device is not transmitted to the transmission device during a process of negotiating call conditions, image quality may be damaged during a process of restoring an image by the reception device. In a basic process of compressing an image, an image sensor of a camera uniformly samples RGB components and converts the sampled RGB signal into an YCbCr signal representing luminance information and chrominance information. However, since human eyes are more sensitive to luminance than chrominance, the image is compressed while a Cb component and a Cr component are reduced more than a Y component. For example, the YCbCr signal is compressed by a video encoder by sampling from a ratio of 4:4:4 to a ratio of 4:2:2, 4:2:0, 4:1:1, or the like. Further, image quality of a display panel of the reception device is influenced by an input signal such as the RGB and the YCbCr, and each panel has an YCbCR format which is most appropriate for color development ability or a pixel structure. However, since the camera or the video encoder of the transmission device does not know information on the YCbCr format appropriate for the display of such a reception device, the image is compressed irrelevant thereto and is transmitted. Thus, there is a problem in that electric power is consumed and the image quality is damaged while the reception device receives and restores the image, which has been compressed and transmitted by the transmission device, and converts the image to be appropriate for a panel input thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for negotiating color information between a transmission device and a reception device in a process of negotiating a session of a video call service, thereby transmitting an image appropriate for the reception device by the transmission device.

Another aspect of the present disclosure is to provide a method and an apparatus for negotiating color information between the transmission device and the reception device in a process of negotiating a session in a video call service, thereby preventing image quality from being damaged or preventing electric power from being consumed, during a process of restoring and converting an image by the reception device.

In accordance with an aspect of the present disclosure, a method of providing a video call service in a communication system is provided. The method includes transmitting, in a process of configuring a session together with a second terminal by a first terminal, resolution information and color information of an image, which are transmittable and receivable, to the second terminal by the first terminal, receiving the resolution information and the color information of the image, which are transmittable and receivable by the second terminal, from the second terminal by the first terminal, and compressing the image according to the received resolution information and the received color information, and transmitting the image to the second terminal, by the first terminal.

In accordance with another aspect of the present disclosure, a method of providing a video call service in a communication system is provided. The method includes receiving, in a process of configuring a session together with a second terminal by a first terminal, resolution information and color information of an image, which are transmittable and receivable, from the second terminal by the first terminal, transmitting the resolution information and the color information, which are determined on the basis of the received resolution information and the received color information as being transmittable and receivable, to the second terminal by the first terminal, and receiving, restoring and displaying the image, which has been compressed and transmitted according to the transmitted resolution information and the transmitted color information, by the first terminal.

In accordance with another aspect of the present disclosure, a terminal device for providing a video call service in a communication system is provided. The terminal device includes a camera configured to photograph an image, an encoder configured to compress the photographed image, and a transmission/reception unit configured to transmit and receive the compressed image, wherein, in a process of configuring a session together with a counterpart terminal, the transmission/reception unit is further configured to transmit, to the counterpart terminal, resolution information and color information of the image, which are transmittable and receivable, to receive, from the counterpart terminal, the resolution information and the color information of the image, which are transmittable and receivable by the counterpart terminal, and to transmit, to the counterpart terminal, the image which is compressed according to the received resolution information and the received color information by the encoder.

In accordance with another aspect of the present disclosure, a terminal device for receiving a video call service in a communication system is provided. The terminal device includes a transmission/reception unit configured to one of transmit an image to a counterpart terminal and receive the image transmitted by the counterpart terminal, a decoder configured to restore the received image, and a display unit configured to display the restored image. In processing of configuring a session together with the counterpart terminal, the transmission/reception unit is further configured to receive, from the counterpart terminal, resolution information and color information of the image, which are transmittable and receivable, to transmit, to the counterpart terminal, the resolution information and the color information of the image, which are determined as being transmittable and receivable on the basis of the received resolution information and the received color information, and to receive the image compressed according to the transmitted resolution information the transmitted color information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates an example of a detailed configuration of an SDP offer in FIG. 1 according to the related art;

FIG. 3 illustrates a detailed configuration of an SDP answer corresponding to FIG. 2 according to the related art;

FIG. 5 illustrates a configuration of an SDP offer according to an embodiment of the present disclosure according to an embodiment of the present disclosure;

FIG. 6 illustrates a configuration of an SDP answer according to an embodiment of the present disclosure according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure figures out a reason that damage of image quality and power consumption is generated in a video call service, and proposes a method for solving the same.

Figure 1:
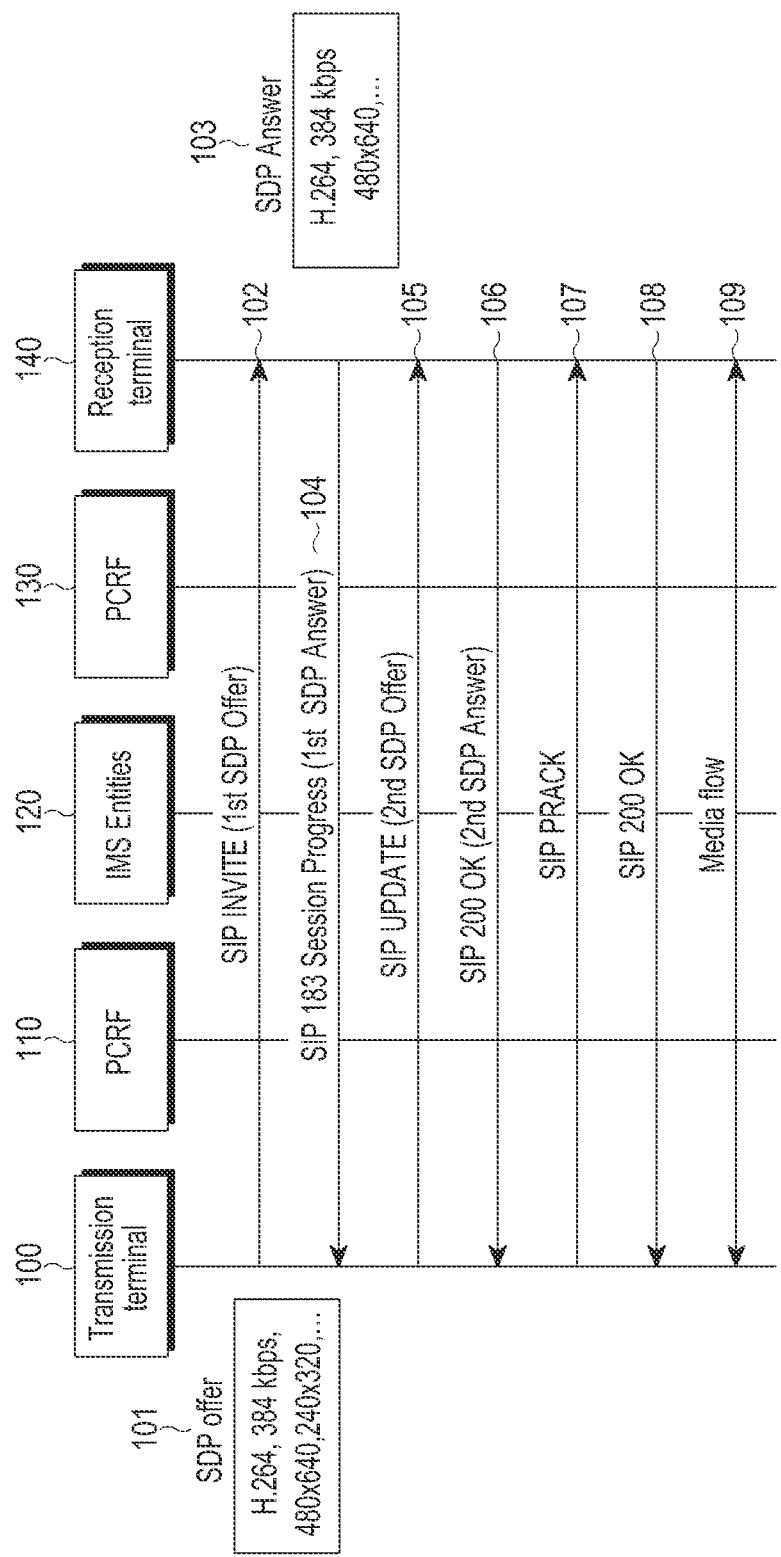
FIG. 1 is a signal flow diagram illustrating a general process of negotiating a session for a video call service based on an IP according to the related art.
Figure 4:
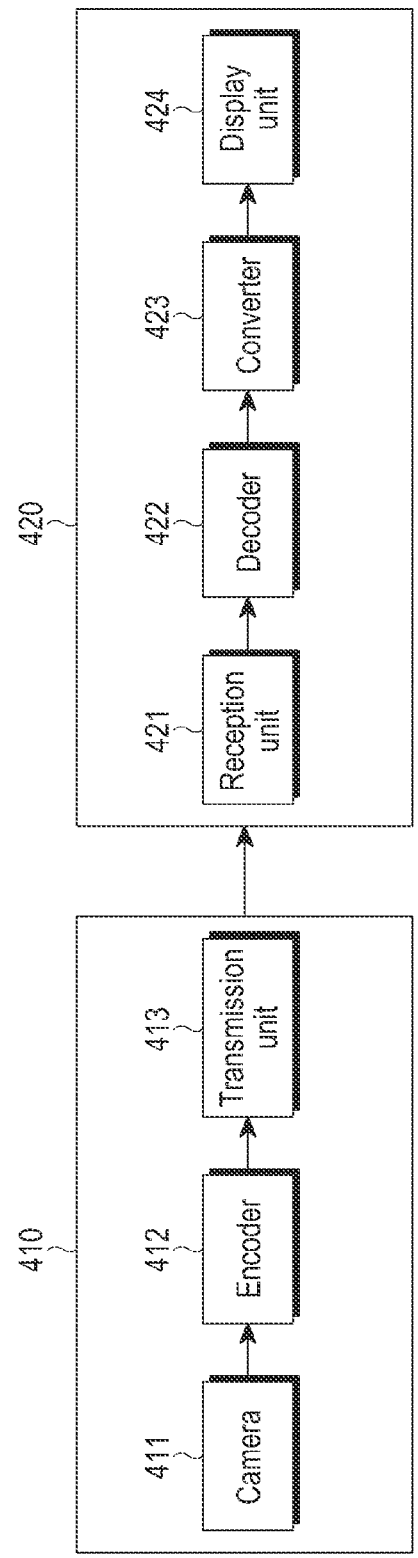
FIG. 4 schematically illustrates configurations of a transmission terminal and a reception terminal for providing a video call service according to an embodiment of the present disclosure.

FIG. 4 schematically illustrates configurations of a transmission terminal and a reception terminal for providing a video call service according to an embodiment of the present disclosure.

Referring to FIG. 4, a transmission terminal 410 includes a camera 411, an encoder 412 and a transmission unit 413, and a reception terminal 420 includes a reception unit 421, a decoder 422, a converter 423 and a display unit 424. In the transmission terminal 410, a color format of an output of the camera 411 and a color format of an input of the encoder 412 coincide with each other. Further, in the reception terminal 420, the decoder 422 restores an image using the color format as it is, which is used for compressing an image by the encoder 412 of the transmission terminal 410. The converter 423 of the reception terminal 420 converts the output of the decoder 422 to fit a specification of a panel of the display unit 424. At this time, the image quality is damaged and electric power is consumed.

Thus, the present disclosure adds a process of negotiating color information to a process of negotiating a session between the transmission terminal and the reception terminal, in order to solve such a problem. Further, the present disclosure proposes a method of adding an attribute included in a message using the previously-used message without defining a new message.

FIG. 5 illustrates a configuration of an SDP offer according to an embodiment of the present disclosure.

Referring to FIG. 5, the transmission terminal supports two types of video CODECs including H.264 and H.263 in the SDP offer which the transmission terminal transmits to the reception terminal. H.264 includes information indicating that an image may be encoded and decoded into four kinds of sizes of 176*144, 240*320, 320*480 and 480*640 at a bit rate of up to 384 kbps and especially an image having a size of 480*640 is desired to be received. Further, H.263 includes only a proposal to use a bit rate of 57 kbps, in which case, a profile and a level value, which indicate an image processing ability of H.263, designate only one size of image of 176*144.

In FIG. 5, a color attribute, which is "a=ColorFormat", is added for each video CODEC as compared with FIG. 2. In H.264 and H.263, the transmission terminal supports YCbCr ratios of 4:4:4, 4:2:2, 4:2:0, 4:1:1 and five kinds of color formats of RGB when sending an image, and equally supports the YCbCr ratios of 4:4:4, 4:2:2, 4:2:0 and 4:1:1 and the five kinds of color formats of RGB when receiving an image. Further, the SDP offer includes information (YCbCr411 [q=0.6]) indicating that the transmission terminal prefers to receive an image compressed in the YCbCr 4:1:1 format when receiving an image from the reception terminal. For reference, in "a=ColorFormat:99", the number 99 is a value allocated in each video CODEC in a payload type. A payload type number of 99 is allocated to H.264, and a payload type number of 100 is allocated to H.263.

FIG. 6 illustrates a configuration of an SDP answer according to an embodiment of the present disclosure.

Referring to FIG. 6, the reception terminal indicates, in the SDP offer received from the transmission terminal, that H.264 video CODEC is selected, a bit rate of 384 kbps is accepted. Conditions that an image is compressed into the size of 480*640 and is then transmitted is accepted and receiving an image compressed into the size of 320*480 ([x=320, y=480, q=0.7]) is preferred. This fact implies that the reception terminal may receive and restore an image of 320*480 simultaneously while compressing an image of 480*640 and transmitting the image of 480*640 to the transmission terminal.

Further, the SDP answer according to an embodiment of the present disclosure further includes a color attribute of "a=ColorFormat" as compared with FIG. 3, and discloses "send YCbCr411 recv YCbCR411" as a detail thereof. That is, as illustrated in FIG. 5, since the transmission terminal prefers a format of YCbCr=411, the SDP answer represents that the reception terminal also desires to transmit an image in the format of YCbCr=411 and receive an image in the format of YCbCr=411. When the color format (YCbCr=411) preferred by the transmission terminal is different from a color format preferred by the reception terminal, if the reception terminal may support a different color format in transmission and reception directions, it may be identified in the SDP answer that the transmission terminal may support different color formats in the transmission direction. In the reception direction, one kind of color format is included in the transmission direction, and two kinds of color formats is included in the reception direction. When the reception terminal may not support different color formats in the transmission direction and reception directions, the reception terminal transmits an image in the transmission and reception direction while the SDP answer includes only one of the color format preferred by the transmission terminal and the color format preferred by the reception terminal.

Since the transmission terminal, which has received such an SDP answer, identifies, in the process of negotiating a session, that the reception terminal wants to transmit an image in the format of YCbCr=411 and to receive an image in the format of YCbCr=411, the session is completely configured. When transmitting an image to the reception terminal, the transmission terminal compresses and transmits an image in the format of YCbCr=411. Then, the encoder of the reception terminal may restore the image in the format of YCbCr=411 and transmit the image to the display unit, and the display unit may display the image restored in the format of YCbCr=411 without a separate format change process.

Figure 7:
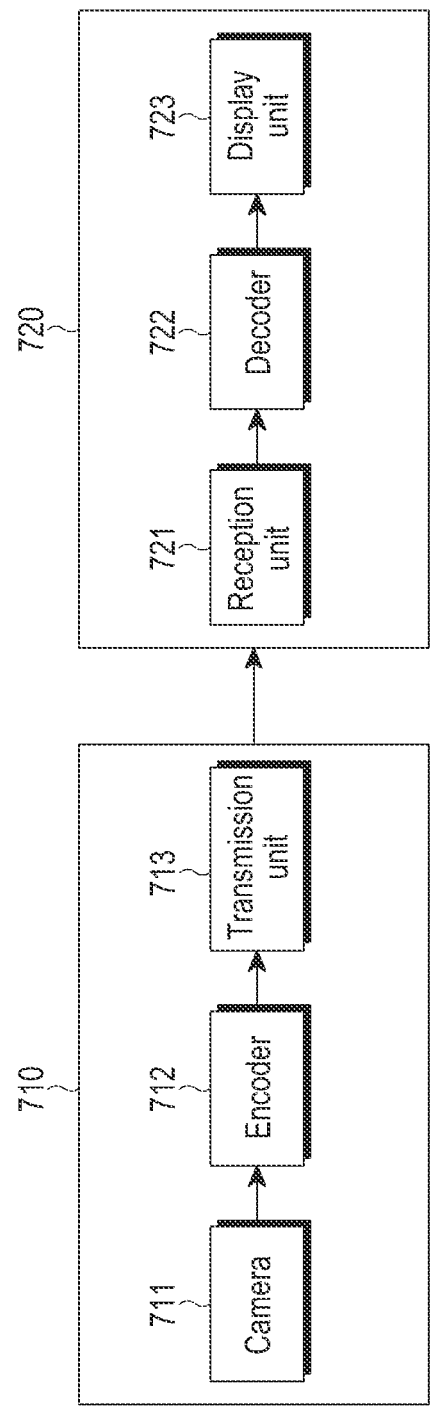
FIG. 7 schematically illustrates configurations of a transmission terminal and a reception terminal according to an embodiment of the present disclosure.

FIG. 7 schematically illustrates configurations of a transmission terminal and a reception terminal according to an embodiment of the present disclosure.

Referring to FIG. 7, a transmission terminal 710 includes a camera 711, an encoder 712 and a transmission unit 713, and a reception terminal 720 includes a reception unit 721, a decoder 722 and a display unit 723. In the transmission terminal 710, a color format of an output of the camera 711 and a color format of an input of the encoder 712 coincide with each other. Further, in the reception terminal 720, the decoder 722 restores an image in the color format used for compressing an image by the encoder 710 of the transmission terminal 712. That is, when the transmission terminal 710 and the reception terminal 720 transmit/receive the SDP offer/answer of FIGS. 5 and 6 in the process of negotiating a session. The encoder 712 of the transmission terminal 710 compresses and transmits an image in the color format of YCbCr=411, and the decoder 722 of the reception terminal 710 restores the image compressed in the color format of YCbCr=411, in the same color format and transfers the restored image to the display unit 723. Then, the display unit 723 may display the image restored in the color format of YCbCr=411 without a separate conversion process.

Figure 8:
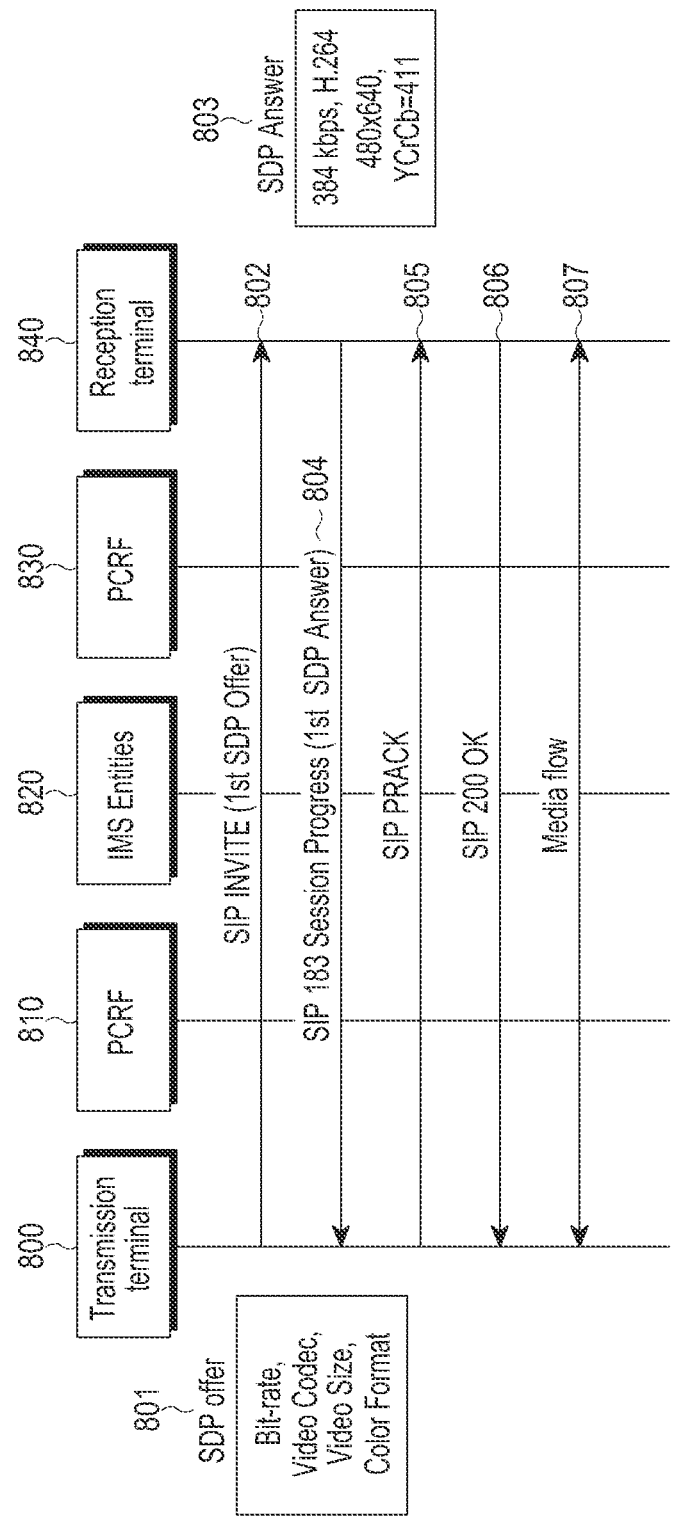
FIG. 8 is a signal flow diagram illustrating a process of negotiating a session for a video call service according to an embodiment of the present disclosure.

FIG. 8 is a signal flow diagram illustrating a process of negotiating a session for a video call service according to an embodiment of the present disclosure.

Referring to FIG. 8, a transmission terminal 800 describes call conditions thereof, on an SDP offer 801, takes the SDP in a SIP INVITE message, and transmits the SIP INVITE message to a reception terminal 840 in operation 802. At this time, the SDD offer 801 included in the SIP INVITE message includes color information of an image which the transmission terminal may transmit/receive, as illustrated in FIG. 5. The transmission terminal 800 stores such color information therein, and may include a memory therefor. The SIP message including such an SDP offer is transferred to the reception terminal 840 via an IMS entity 820 and Policy and Charging Rules Function (PCRFs) 810 and 830 in a wired/wireless network which guarantees call quality, such as a VoLTE, and is transferred to the reception terminal via a management server in the Internet.

The reception terminal 840, which has received the SIP message including the SDP offer of the transmission terminal 800, compares, with information included in the SDP offer, information stored therein. That is, an image processing ability, a service policy, a bit rate, the size of an image, and the like, of video COder/DECoders (CODECs) mounted therein, selects call condition information and color information appropriate therefor. The reception terminal 840 writes an SDP answer 803, takes the SDP answer 803 in a SIP 183 session progress, and transmits the SIP 183 session progress to the transmission terminal 800 in operation 804. In FIG. 8, the SDP answer 803 included in the SIP 183 session progress includes "YCrCb=411" as color information selected by the reception terminal 840.

The transmission terminal 800, which has received the SDP answer, accepts the SDP answer of the reception terminal 840 and transmits a SIP PRACK as a response in operation 805, and the reception terminal 840 transmits a SIP 200 OK message as a response thereto, so that an image service starts in operations 806 and 807.

Further, when the reception terminal 840 may not find color information appropriate therefor from the SDP offer, the reception terminal 840 may write an SDP answer, which proposes second-best color information and transmit the SDP answer to the transmission terminal 800. The reception terminal transmits two pieces of color information including color information preferred by the transmission terminal and color information not included in the SDP offer but preferred thereby, as color information included in the SDP answer and desired to be received. However, even through such negotiations, the possibility of using the color format not included in the SDP offer (i.e., the color format originally supported by the transmission terminal is low).

While the present disclosure has been shown and described with reference to various embodiments thereof, it will be by those skilled in the art that various changes in forms and details may be made therein without departing from the spirit and scope of the present disclosure as defined by the appended claims and the equivalent.

The invention claimed is:

1. A method of providing a video call service in a communication system, the method comprising:
   transmitting, in a process of configuring a session together with a second terminal by a first terminal, first resolution information and first color information of an image, which are transmittable and receivable by the first terminal, to the second terminal by the first terminal;
   receiving, in the process of configuring the session, second resolution information and second color information of the image, which are transmittable and receivable by the second terminal, from the second terminal by the first terminal; and
   compressing the image according to the received second resolution information and the received second color information, and transmitting the image to the second terminal, by the first terminal.

2. The method of claim 1,
   wherein the first resolution information and the first color information, which are receivable by the first terminal, include preference information, and
   wherein the second resolution information and the second color information are information selected in consideration of the preference information.

3. The method of claim 1,
   wherein the first resolution information and the first color information, which are receivable by the first terminal, include preference information, and
   wherein the second resolution information and the second color information, which are transmittable, among the second resolution information and the second color information, which are transmittable and receivable, are selected in consideration of the preference information.

4. The method of claim 1,
   wherein the second resolution information and the second color information, which are receivable, among the second resolution information and the second color information, which are transmittable and receivable, include preference information, and
   wherein, in the compressing of the image and the transmitting of the image to the second terminal, the image is compressed in consideration of the preference information.

5. The method of claim 1, wherein the second resolution information and the second color information, which are receivable, among the second resolution information and the second color information, which are transmittable and receivable, are information indicating a resolution and a color format, which are appropriate for a display device of the second terminal.

6. The method of claim 1, wherein the first resolution information and the first color information of the first terminal and the second resolution information and the second color information of the second terminal are transmitted/received according to a Session Description Protocol (SDP).

7. A method of providing a video call service in a communication system, the method comprising:
   receiving, in a process of configuring a session together with a second terminal by a first terminal, first resolution information and first color information of an image, which are transmittable and receivable by the second terminal, from the second terminal by the first terminal;
   transmitting, in the process of configuring the session, second resolution information and second color information, which are determined on the basis of the received first resolution information and the received first color information as being transmittable and receivable by the first terminal, to the second terminal by the first terminal; and
   receiving, restoring and displaying the image, which has been compressed and transmitted based on the second resolution information and the second color information, by the first terminal.

8. The method of claim 7,
   wherein the first resolution information and the first color information, which are receivable by the second terminal, among the first resolution information and the first color information, which are transmittable and receivable, include preference information, and
   wherein the second resolution information and the second color information are information selected in consideration of the preference information.

9. The method of claim 7,
   wherein the first resolution information and the first color information, which are receivable by the second terminal, include preference information, and
   wherein the second resolution information and the second color information, which are transmittable, among the second resolution information and the second color information, which are transmittable and receivable, are information selected in consideration of the preference information.

10. The method of claim 7,
    wherein the second resolution information and the second color information of the image, which are receivable, among the second resolution information and the second color information, which are transmittable and receivable, include preference information, and
    wherein, in the receiving of the compressed image, the image is compressed in consideration of the preference information.

11. The method of claim 7, wherein the second resolution information and the second color information, which are receivable, among the second resolution information and the second color information of the image, which are transmittable and receivable, are information indicating a resolution and a color format which are appropriate for a display device of the first terminal.

12. The method of claim 7, wherein the second resolution information and the second color information of the first terminal and the first resolution information and the first color information of the second terminal are transmitted/received according to the SDP.

13. A terminal device for providing a video call service in a communication system, the terminal device comprising:
    a camera configured to photograph an image;
    an encoder that compresses the photographed image; and
    a transmission/reception unit configured to transmit and receive the compressed image,
    wherein, in a process of configuring a session together with a counterpart terminal, the transmission/reception unit is further configured to:
       transmit, to the counterpart terminal, first resolution information and first color information of the image, which are transmittable and receivable by the transmission/reception unit, receive, from the counterpart terminal, second resolution information and second color information of the image, which are transmittable and receivable by the counterpart terminal, and transmit, to the counterpart terminal, the image which is compressed according to the second resolution information and the second color information by the encoder.

14. The terminal device of claim 13,
wherein the first resolution information and the first color information, which are receivable, among the first resolution information and the first resolution information, which are transmittable and receivable, include preference information, and
wherein the second resolution information and the second color information are information selected in consideration of the preference information.

15. The terminal device of claim 13,
wherein the first resolution information and the first color information, which are receivable, among the first resolution information and the first color information, which are transmittable and receivable, include preference information, and
wherein the second resolution information and the second color information, which are transmittable, among the second resolution information and the second color information, which are transmittable and receivable, are information selected in consideration of the preference information.

16. The terminal device of claim 13,
wherein the second resolution information and the second color information, which are receivable, among the second resolution information and the second color information, which are transmittable and receivable, include preference information, and
wherein the encoder is further configured to compress the image in consideration of the preference information of the resolution information.

17. The terminal device claim 13, wherein the second resolution information and the second color information, which are receivable, among the second resolution information and the second color information, which are transmittable and receivable, are information indicating a resolution and a color format which are appropriate for a display device of the counterpart terminal.

18. The terminal device of 13, wherein the transmission/reception unit is further configured to transmit and receive the first resolution information and the first color information, and the second resolution information and the second color information according to a Session Description Protocol (SDP).

19. The terminal device of claim 13, wherein, when the first color information received from the counterpart terminal indicates that the counterpart terminal does not find the first color information appropriate for the counterpart terminal, the counterpart terminal proposes a second-best color information.

20. A terminal device for receiving a video call service in a communication system, the terminal device comprising:
a transmission/reception unit configured to transmit an image to a counterpart terminal or to receive the image transmitted by the counterpart terminal;
a decoder configured to restore the received image; and
a display unit configured to display the restored image,
wherein, in a processing of configuring a session together with the counterpart terminal, the transmission/reception unit is further configured to:
receive, from the counterpart terminal, first resolution information and first color information of the image, which are transmittable and receivable by the counterpart terminal,
transmit, to the counterpart terminal, second resolution information and second color information of the image, which are determined as being transmittable and receivable by the transmission/reception unit on the basis of the first resolution information and the received first color information, and
to receive the image compressed based on the second resolution information and the second color information.

21. The terminal device of claim 20,
wherein the first resolution information and the first color information, which are receivable, among the first resolution information and the first color information received from the counterpart terminal, which are transmittable and receivable, include preference information, and
wherein the second resolution information and the second color information are information selected in consideration of the preference information.

22. The terminal device of claim 20,
wherein the first resolution information and the first color information of the image, which are receivable, among the first resolution information and the first color information received from the counterpart terminal, which are transmittable and receivable, include preference information, and
wherein the second resolution information and the second color information, which are transmittable, among the second resolution information and the second color information, which are transmittable and receivable, are information selected in consideration of the preference information.

23. The terminal device of claim 20,
wherein the second resolution information and the second color information of the image, which are receivable, among the second resolution information and the second color information, which are transmittable and receivable, include preference information, and
wherein the transmission/reception unit is further configured to receive the image compressed in consideration of the preference information.

24. The terminal device of claim 20, wherein the second resolution information and the second color information, which are receivable, among the second resolution information and the second color information of the image, which are transmittable and receivable, are information indicating a resolution and a color format which are appropriate for the display unit.

25. The terminal device of claim 20, wherein the transmission/reception unit is further configured to transmit and receive the first resolution information and the first color information, and the second resolution information and the second color information according to a Session Description Protocol (SDP).

* * * * *